July 8, 1952     G. FARINA     2,602,297

MASTER CYLINDER ASSEMBLY FOR FLUID PRESSURE SYSTEMS

Filed Jan. 31, 1950

Inventor
Giovanni Farina
By Robert E. Burns
Attorney

UNITED STATES PATENT OFFICE 2,602,297

MASTER CYLINDER ASSEMBLY FOR FLUID PRESSURE SYSTEMS

Giovanni Farina, Turin, Italy

Application January 31, 1950, Serial No. 141,407
In Italy February 9, 1949

1 Claim. (Cl. 60—54.6)

This invention relates to devices for producing a fluid pressure, for instance for operating motor vehicle brakes, of the type in which the master cylinder is provided with auxiliary reservoir with which it is connected through holes or restricted passages when the piston is in its inoperative position, said passages closing when the piston starts its forward movement for transmitting the control.

It is known to provide said auxiliary reservoir with a spring-pressed auxiliary piston which exerts on the fluid contained therein a predetermined pressure that is transmitted throughout the hydraulic brake operating circuit when the main piston is in its inoperative position, thereby insuring a certain pressure in said circuit without using a valve between the master cylinder and pipe leading to the wheel cylinders.

The auxiliary reservoir under pressure, however, requires to be hand actuated for filling it and stretching the spring, and control means are required to detect release of the spring for any reason whatever in consequence of total or partial emptying of said reservoir.

This invention relates to a device adapted to obviate the above mentioned drawbacks, by which the degree of filling of the auxiliary reservoir under pressure and the desired pressure on the fluid contained therein, hence on all the fluid enclosed in the plant in the inoperative position, are automatically maintained constant.

I obtain this by automatically producing on each compression stroke of the main piston the flow of a certain limited quantity of hydraulic fluid from the auxiliary reservoir without pressure to a pressure reservoir from which the excess fluid, after having lifted the piston of the latter reservoir against the action of the spring, escapes through suitable holes which are uncovered by said piston and flows to the auxiliary reservoir without pressure which surrounds the pressure reservoir or may communicate therewith.

The fluid which is supplied to the reservoir under pressure every time the master cylinder is actuated, is drawn from the reservoir without pressure.

According to a preferred embodiment of my invention, this result is obtained by causing the master cylinder to act as a pump for circulating the fluid between the two reservoirs.

The accompanying drawing shows by way of example a construction of my improved device.

Figure 1:
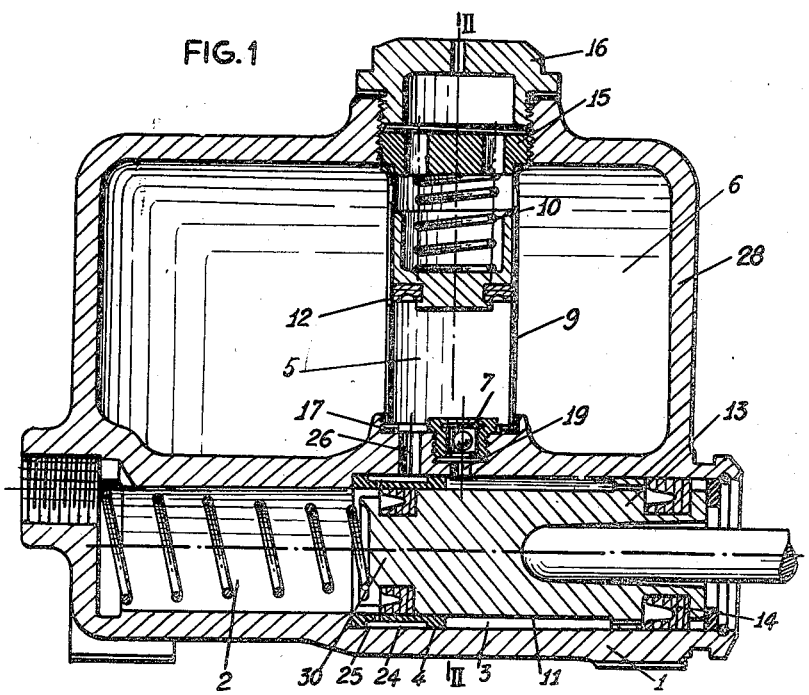
Figure 2:
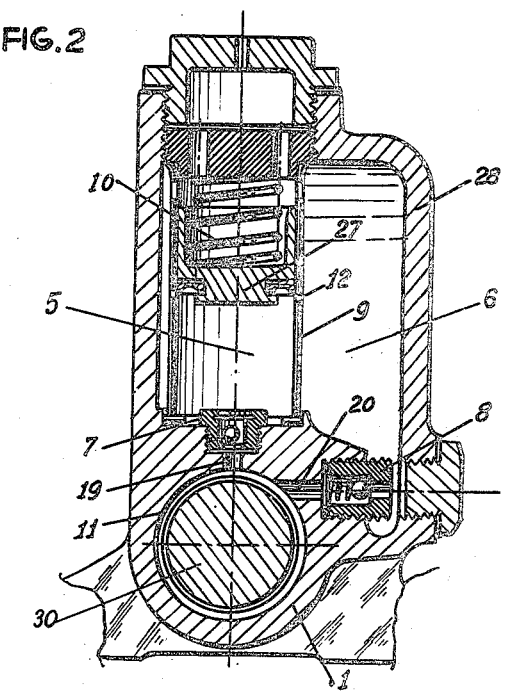

Figure 1 is an axial longitudinal section, and Figure 2 is a cross sectional view on line II—II of Figure 1.

1 denotes the master cylinder having two chambers differing in diameter, namely a front chamber 2 smaller in diameter and a rear chamber 3 larger in diameter.

The bush 4 equalling in inner and outer diameter the bores of chambers 2 and 3, respectively, is fitted in front of the chamber 3 and establishes connection between the chamber 2 and chamber 5 of the auxiliary reservoir under pressure 9 through radial capillary holes 25, annular groove 24 and passage 26.

The piston 30 sliding in the chamber 2 of the master cylinder is formed with a further head 13 complementary to the chamber 3 and provided with a packing 14.

The annular chamber 11 communicates through the passage 19 and delivery valve 7 with the chamber 5 in the auxiliary reservoir under pressure 9 and through the passage 20 (Fig. 2) and suction valve 8 with the chamber 6 in the main reservoir without pressure 28.

Consequently, when the differential piston 30—13 described above is moved forward for applying the brakes, it acts by its front head 30 for transmitting said control and allows by its rear head 13 the fluid, which filled the annular chamber 11, to reach the chamber 5 of the auxiliary reservoir under pressure 9 through the valve 7.

On the return stroke of the piston, its rear head 13 establishes an underpressure in the annular chamber 11 causing the suction valve 8 to open and the fluid to flow from the chamber 6 in the main reservoir without pressure 28 to the abovementioned chamber 11 which is refilled and is ready to supply liquid to be admitted into the chamber 5 in the pressure reservoir 9 when the brake is next applied.

The auxiliary reservoir under pressure 9 comprises in the construction shown a tubular body fitted in suitable seatings formed in the bodies 1 of the master cylinder with the interposition of a packing 17 for sealing against the chamber 6.

The piston 27 which is slidably mounted within the cylindrical body 9, is subjected to the action of the spring 10 and uncovers the holes 12 when it is forced back by the fluid which flows to said body, thereby discharging the excess fluid into the reservoir 6, whereupon the pressure in the chamber 5 and throughout the hydraulic brake circuit resumes its predetermined value.

A screw-threaded collar 15 is provided at the top of the reservoir 28 for clamping the pipe 9 and is acted upon by the spring 10. 16 denotes a plug closure.

What I claim is:

In a fluid pressure producing device, in combination a master cylinder comprising two coaxial parts of different diameter joined by a surface perpendicular to the cylinder axis, a piston slidable in said cylinder, a communication to the brake system placed in the cylinder opposite the slidable piston, the slidable piston dividing the cylinder into two chambers, namely a first chamber disposed between the front wall of the piston and the communication with the brake system, and a second chamber disposed between the side wall of the piston and the part of the cylinder of larger diameter respectively, a first reservoir under atmospheric pressure for the brake fluid, a second reservoir for the brake fluid, means for constantly holding under pressure the fluid in said second reservoir, a communication, between the first and second reservoirs for discharging into the first reservoir the excess fluid of the second reservoir, a communication between the reservoir under atmospheric pressure and the second chamber in the master cylinder, a valve controlling said communication and permitting flow of fluid merely from the reservoir under atmospheric pressure to the second chamber, said valve opening during the return stroke of the master piston and permitting filling of said second chamber by the liquid of the reservoir under atmospheric pressure, a communication between said second chamber and the reservoir of the compressed fluid, a valve in said communication preventing return of fluid under pressure to said second chamber but permitting flow of fluid in an opposite direction, a second communication between the pressure fluid reservoir and the first chamber in the master piston, said second communication being open merely when the piston is in its fully retracted position.

GIOVANNI FARINA.

REFERENCES CITED

The following references are of record in the file of this patent:

UNITED STATES PATENTS

| Number | Name | Date |
| --- | --- | --- |
| 2,217,461 | Weihe | Oct. 8, 1940 |
| 2,232,350 | Swift | Feb. 18, 1941 |
| 2,501,103 | Wahlberg | Mar. 21, 1950 |